S. J. FISH.
EGG TESTING MACHINE.
APPLICATION FILED JULY 11, 1914.

1,155,905.

Patented Oct. 5, 1915.
3 SHEETS—SHEET 1.

Witnesses

S. J. Fish, Inventor
by C. A. Snow & Co.
Attorneys

S. J. FISH.
EGG TESTING MACHINE.
APPLICATION FILED JULY 11, 1914.
1,155,905.
Patented Oct. 5, 1915.
3 SHEETS—SHEET 2.
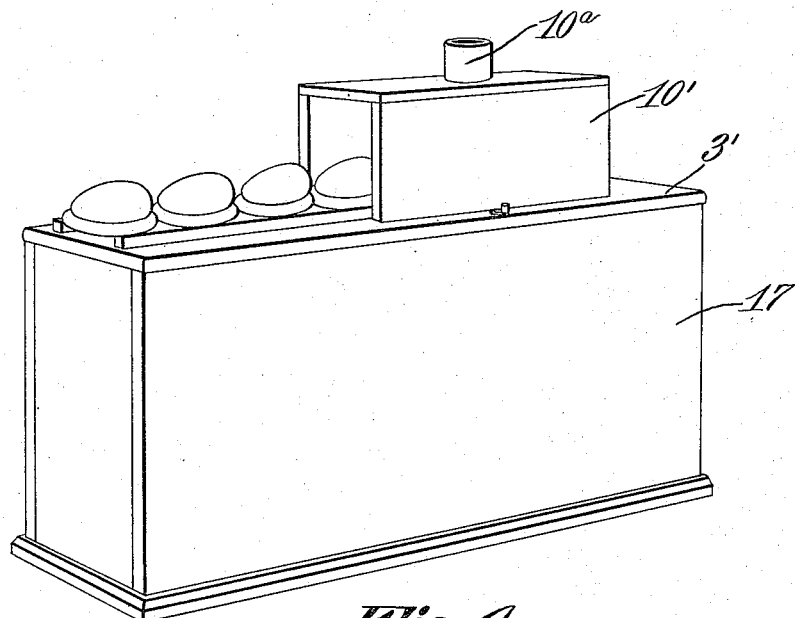
Fig. 4.
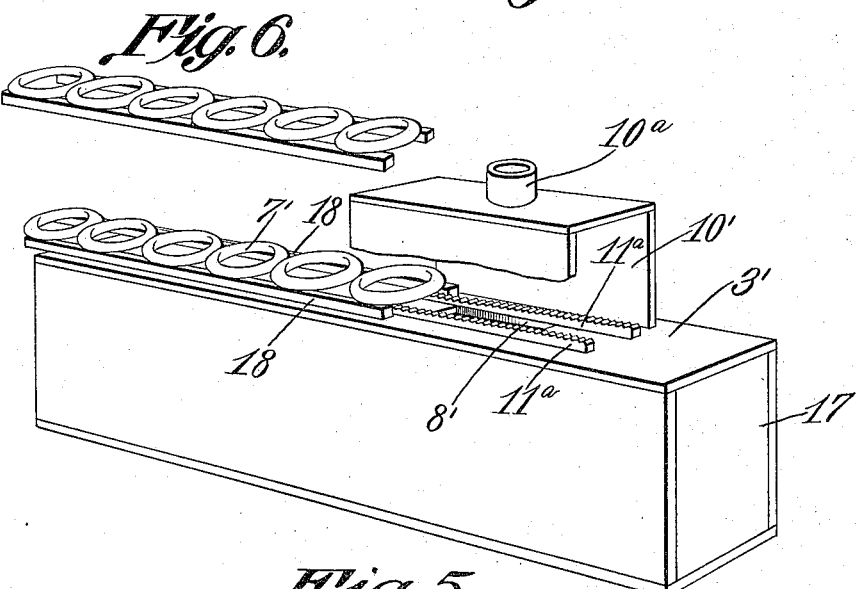
Fig. 6.
Fig. 5.
Witnesses
S. J. Fish, Inventor
by C. A. Snow & Co.
Attorneys S. J. FISH.
EGG TESTING MACHINE.
APPLICATION FILED JULY 11, 1914.
1,155,905.
Patented Oct. 5, 1915.
3 SHEETS—SHEET 3.
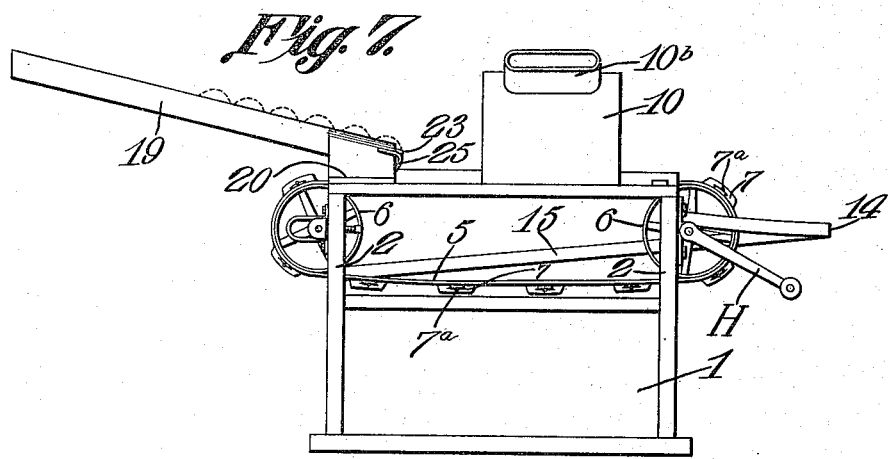
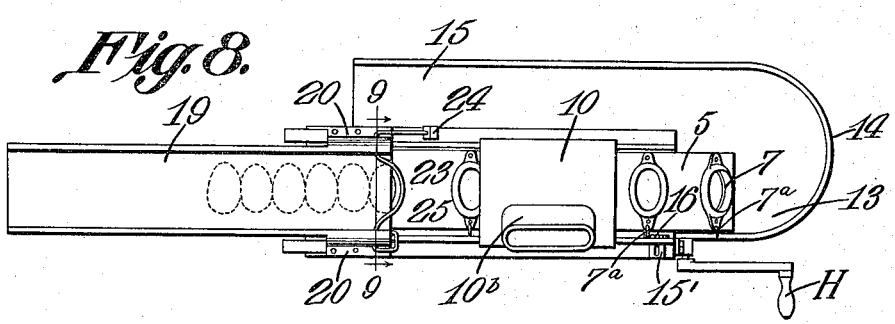
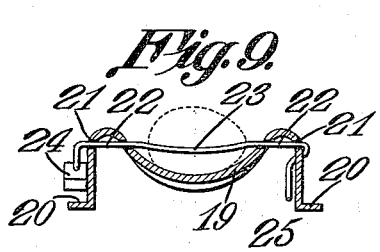
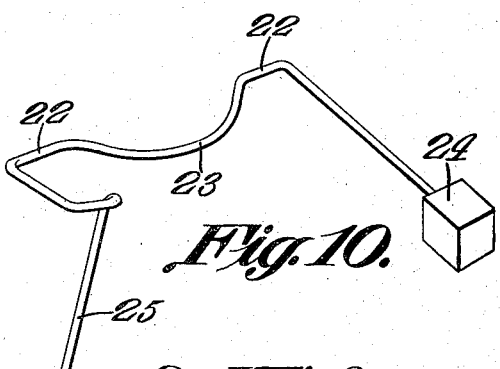

UNITED STATES PATENT OFFICE.

SQUIRE J. FISH, OF JACKSON, MICHIGAN.

EGG-TESTING MACHINE.

1,155,905.  Specification of Letters Patent.  Patented Oct. 5, 1915.

Application filed July 11, 1914. Serial No. 850,408.

*To all whom it may concern:*

Be it known that I, SQUIRE J. FISH, a citizen of the United States, residing at Jackson, in the county of Jackson and State of Michigan, have invented a new and useful Egg-Testing Machine, of which the following is a specification.

The present invention relates to improvements in egg testing machines, the present structure being an improvement upon that shown in my Patent No. 1,040,919 dated October 8, 1912, one object of the present invention, being the provision of means which are adapted to impart a rolling motion to the eggs as the same are presented between the electric light and the sight aperture, so that the eggs can be inspected or candled while in motion, thus insuring the best possible inspection thereof.

A further object of the invention, is the provision of a novel arrangement of egg rolling means which is adapted to coöperate with the egg carrying member so that the eggs are lifted relatively to the holders while in transit, but are still guided by the rollers during the candling operation.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
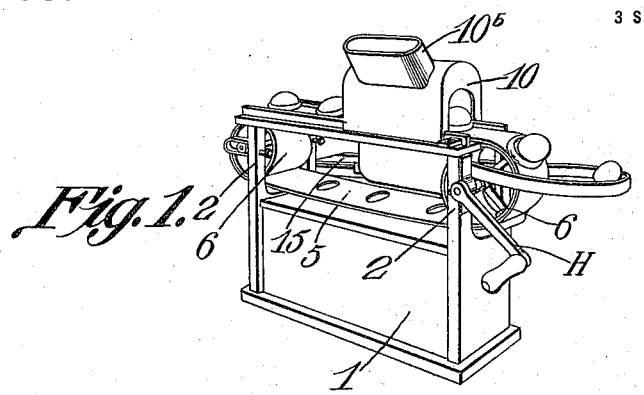
Figure 2:
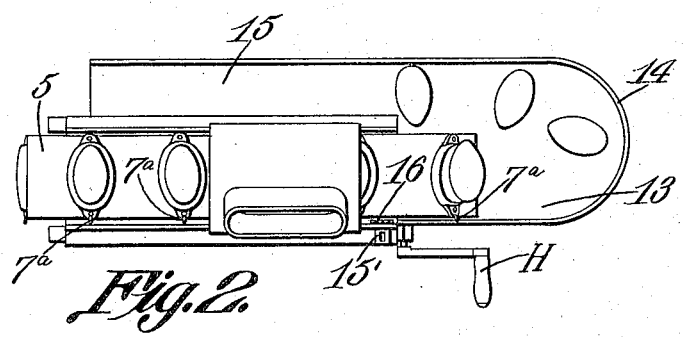
Figure 3:
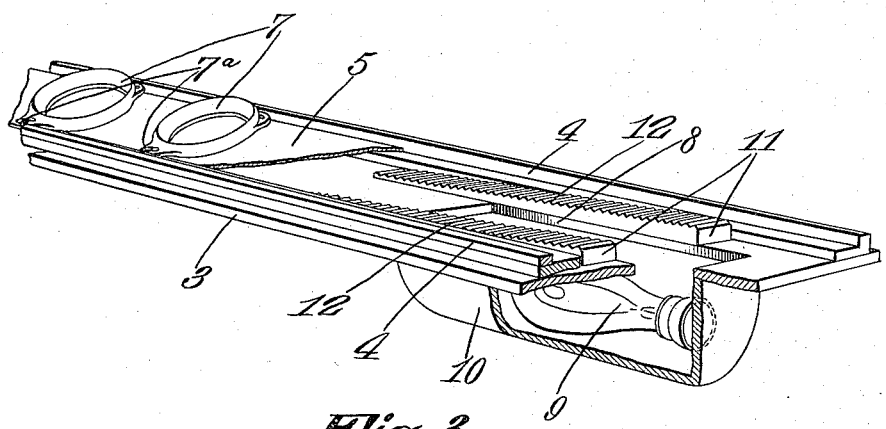

In the drawings—Figure 1 is a perspective view of a large sized machine constructed according to and embodying the present invention. Fig. 2 is a top plan view thereof. Fig. 3 is a perspective view showing a portion thereof adjacent the light projecting aperture with a portion of the belt and egg trays being shown. Fig. 4 is a perspective view of a small machine embodying the present invention. Fig. 5 is a similar view showing the egg rolling means adjacent the light projecting aperture, the light excluding member being broken away. Fig. 6 is a detail perspective view of the egg tray used in connection with the structure shown in Figs. 4 and 5. Fig. 7 is a side elevation of the machine as shown in Fig. 1 equipped with means for feeding and counting the eggs tested. Fig. 8 is a top plan view thereof. Fig. 9 is a cross section taken on line 9—9 of Fig. 8. Fig. 10 is a perspective view of the egg retarding and delivering member.

Referring to the drawings, and particularly to Figs. 1, 2 and 3, the numeral 1 designates the supporting member which is adapted to contain a battery, and which constitutes a base for the apparatus when power or lighting circuit is employed. In these forms of apparatus, the circuit mechanism as shown in my before mentioned patent, or a normally closed circuit controlled by a single switch may be employed. The supports 2 are carried by the base or support 1 at opposite ends thereof and attached to the said support is a platform or top 3, which is provided with the two guide plates or strips 4 between which are adapted to pass and rest, the belt 5, said belt 5 being properly trained over the operating wheels 6, which in turn are operated through the handle H.

Formed in the platform or top is the elongated slot or opening 8, which is directly above the electric light 9 which is surrounded by the light excluding hood 10. By this means rays of light from the lamp 9 are projected upwardly through the slot 8. A hood 10 is carried by the platform or top 3 adjacent the opening 8, and is provided with an observation portion 10$^b$, at the top whereby the candling operation may be observed. Carried by the belt 5 are a plurality of egg holders or open elliptical rings 7, which permit the eggs to lie lengthwise transversely of the machine and have a portion thereof projecting below the belt or member 5, so that when the eggs one at a time approach the opening or slot at 8, the same will engage the serrated or roughened edges 12 of the inclined bars or members 11, there being two, one disposed upon each side of the slot 8 and longitudinally of the top 3, so that the eggs will thus be gradually elevated from contact with the holders 7 and have rotation imparted thereto during their passage above the opening or slot 8. By this means, the eggs will be rolled during the candling operation. By this means the light rays are not blurred during the rolling of the eggs, due to the proper positioning of the bars 11.

In the form of apparatus shown in Fig. 1, the eggs after passage through the tunnel 10 and when at the end of the machine as viewed at the right, are caused to be delivered upon the shelf 13, a rim 14 being provided to guide the eggs to the inclined guide 15. A connection 16 of the "Veeder" type, having a star wheel 16', for engagement with the pins 7ª of the holders, is provided to automatically count the eggs tested.

In the construction of the smaller machine, as shown in Figs. 4, 5 and 6, a box 17, which constitutes a battery box for the lighting circuit, is provided, the cover 3' which is similar to the platform 3 heretofore described being provided with the light projecting aperture or slot 8' adjacent the tunnel member 10' which in this instance is provided with the sighting member 10ª. The inclined toothed bars 11ª which correspond to the bars 11, heretofore described, are disposed longitudinally of and one at each side of the slot 8', and constitute in this instance, a guide for the two bars 18 of the egg carrying tray or member, which is provided with the elliptical open rings or egg carrying members 7' which are constructed similarly to the members 7 heretofore described. Thus the bars 11ª in this instance not only form the egg rolling members as in the structure heretofore described but also constitute a guide for the egg tray during the manual moving thereof through the tunnel member 10'.

It will thus be seen that any form of electrical circuit or in fact any lighting means may be employed in connection with the present device, the essential feature therein being the means whereby the eggs are rolled at the proper time when passing the light, and such means being so arranged as not to obstruct the projection of the light rays upon the eggs while being thus rolled.

As shown in Figs. 7 through 10, the egg testing machine as shown in Figs. 1, 2 and 3 is equipped with means whereby the eggs are fed to the receptacle 7, the feeding thereof being operated entirely by the receptacles, so that each egg will be delivered as the receptacle is in receiving position. In this instance, the tray or delivery chute 19 is attached as at 20 to the egg testing machine, while journaled in the apertures 21 in the sides of the chute at the lower end thereof, are the journaling portions 22 of the detent or egg engaging member 23, such member 23 being curved and provided with the weighted terminal 24 which normally holds the same in the path of the egg, as shown in Fig. 9, to prevent the passage thereof out of the chute into the next succeeding receptacle 7. The arm 25 of the egg holding and delivering member 23, is so disposed that when the tray or receptacle 7 which is disposed to receive the next succeeding egg from the chute 19, is below the outlet end of the chute 19, the member 7ª thereof which also actuates the counter 15', will engage the arm 25 and thus tilt the egg engaging portion 23 against the action of the weight 24, so that the lowermost egg will be delivered into the holder 7. The release of the pin 7ª from the arm 25 will permit the holder 23 to return by gravity due to the weight 24 so that the next succeeding egg is held in proper position within the chute 19 and against the passage thereof upon the belt 5. By this means it will be seen that the eggs are automatically fed to the testing machine, and that the same are counted before the delivery thereof into the chute 15.

What is claimed is:

1. In an egg testing machine, a frame having a pair of bars provided with inclined roughened portions, there being a light opening between the bars, and an egg holder movable over said opening and having an aperture for receiving an egg whereby the egg depends partially below the holder, so that the egg is arranged to engage and roll upon the said bars when the holder passes over said opening.

2. In an egg testing machine, an egg carrying member having a series of egg holders, an egg delivery chute under the lower end of which the egg carrying member is movable, a curved detent having portions journaled to the sides of the chute adjacent the lower end thereof and having an arm, and means carried by the egg carrying member and coöperable with said arm for swinging the detent to egg releasing position when the holders pass from under the chute.

In testimony that I claim the foregoing as my own, I have hereto affixed my signature in the presence of two witnesses.

SQUIRE J. FISH.

Witnesses:
WILLIAM V. DAILEY,
BYRON E. BEGEL.

Copies of this patent may be obtained for five cents each, by addressing the "Commissioner of Patents, Washington, D. C."